April 23, 1968 F. H. BRATTON ET AL 3,379,606

TRANSPARENT LAMINATED WEATHER RESISTANT MATERIAL

Filed Oct. 8, 1964

INVENTORS
FRANCIS H. BRATTON,
JAMES MALCOLM BROZ
BY
Meyers & Peterson
ATTORNEYS

United States Patent Office 3,379,606 Patented Apr. 23, 1968

3,379,606

TRANSPARENT LAMINATED WEATHER RESISTANT MATERIAL

Francis H. Bratton, Northfield, and James M. Broz, Savage, Minn., assignors to G. T. Schjeldahl Company, Northfield, Minn., a corporation of Minnesota Filed Oct. 8, 1964, Ser. No. 402,434
6 Claims. (Cl. 161—189)

ABSTRACT OF THE DISCLOSURE

An optically clear, mechanically sound weatherable laminate structure comprising a film of mechanically sound strength and a protective weatherable film adhesively bonded to the surface of the film of mechanically sound strength. The film of mechanically sound strength is preferably polyvinyl chloride, and the weatherable film bonded thereto is preferably a fluorinated hydrocarbon film selected from the class consisting of polychlorotrifluoroethylene and polyvinyl fluoride. The adhesive which bonds the films together contains an ultraviolet radiation absorber for excluding incident ultraviolet radiation.

Figure 1:
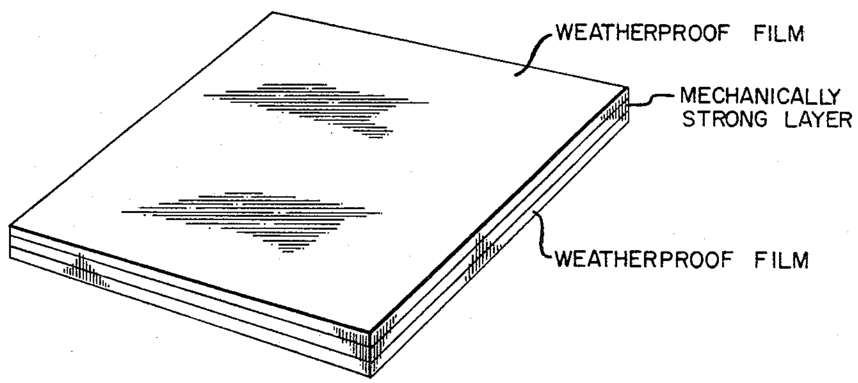

The present invention relates generally to an improved laminate structure, and more specifically to an improved laminate structure which is a composite arrangement of films, each film in the laminate having been selected for its mechanical or weather-proof properties, and thereafter appropriately placed in the composite laminate structure.

Laminate structures which have sound mechanical strength and which are weather proof may be used for a wide variety of applications such as, for example, for the development of flexible windows for military vehicles. At the present time, various laminates are available for use in this application, these laminates having reasonably good optical properties and also being weatherable. One such material is a three layer laminate of films of polyethylene terephthalate-polyvinyl chloride-polyethylene terephthalate. Among the disadvantages of these presently used materials, however, are the loss of flexibility at low temperatures, the acquisition of wrinkles, sets, and stains when stored over extended periods of time, the generation of substantial sound or noise under flexure due to exposure to wind conditions or the like, and the difficulty encountered in sewing the materials. As a special requirement for any windows for military vehicles, and including flexible windows, the structures must provide substantial scratch and abrasive resistance as well as stain, spot, and solvent resistance.

In accordance with the present invention, a laminate structure which is optically clear and mechanically sound is provided, this material being flexible and clear at a temperature of −65° F. The laminate structure of the present invention provides substantial scratch and abrasive resistance, as well as stain, spot, and solvent resistance. This material is quiet when flexed in wind at 60 m.p.h., maintains its visual clarity throughout its useful life, and is readily adaptable to being sewn by conventional sewing techniques. The flexibility of the laminate structure at −65° F. is achieved by utilizing plasticized polyvinyl chloride for the mechanically strong layer, the flexibility being retained over an extensive period of time by the use of an external layer which is impermeable to the plasticizer employed in the polyvinyl chloride. The silent wind flexing is achieved by the dampening effect of the adhesive employed in the laminate together with the use of a low modulus of elasticity films. The visual clarity and capability of being sewn is due to the combined physical characteristics of the films utilized in the laminates.

Briefly, in accordance with the present invention, a laminate structure is prepared which is optically clear and mechanically sound, the laminate sandwich including external layers of a fluorinated hydrocarbon film selected from the class consisting of polychlorotrifluoroethylene and polyvinyl fluoride, the interior or mechanically sound film being essentially a plasticized polyvinyl chloride. The fluorinated hydrocarbon film, which is preferably polychlorotrifluoroethylene, is clear and is substantially impermeable to water and other vapors. The physical properties of the polychlorotrifluoroethylene are comparable to the physical properties of plasticized polyvinyl chloride, and hence the match of physical properties renders the laminate film of greater durability. In addition, this material inhibits the migration of the plasticizer, hence the flexibility of the laminate is retained over a long perod of time. The adhesive layer or film which bonds the surfaces of the weatherable material with the mechanically strong material preferably contains an ultraviolet absorbing compound in order to protect the characteristics and properties of the mechanically strong layer. The ultraviolet absorber is essentially colorless, and absorbs little, if any, visible light. The strong absorption occurs, therefore, only in the ultraviolet range.

One additional feature of this laminate is that it retains its flexibility at temperatures which may be as low as −320° F. This feature, may in part, be attributed to the thin cross section of the laminate, which may be as low as 12 to 13 mils for usable materials. Previously used laminates required a thickness of about 30 mils. Because of this thin cross section, the additional advantage of a reduction in weight is achieved.

Therefore, it is an object of the present invention to provide an improved laminate structure which is optically clear and mechanically sound, and which retains its flexibiilties at extremely low temperatures.

It is a further object of the present invention to provide improved optically clear, mechanically sound laminate which is quiet when flexed at 60 m.p.h.

It is still a further object of the present invention to provide an improved optically clear mechanically sound laminate structure which retains its visual clarity over an extremely long period of time, and which is capable of being sewn into a retaining medium such as canvas or the like.

Figure 2:
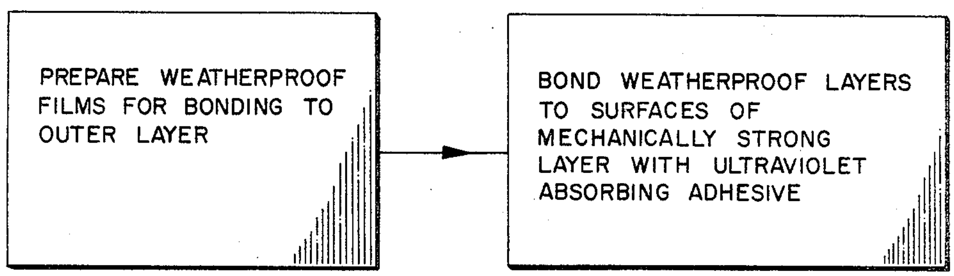

Other and further objects of the present invention will become apparent to those skilled in the art upon a study of the following specification, appended claims, and accompanying drawings wherein:

FIGURE 1 is a perspective view of a laminate structure prepared in accordance with the present invention; and FIGURE 2 is a flow diagram showing one possible technique for preparing a laminate structure in accordance with the present invention.

In accordance with the preferred modification of the present invention, a laminate is provided which is optically clear, mechanically sound, and capable of being exposed to the elements. This laminate structure includes a mechanically sound layer or film which has a weatherable film bonded thereto along at least one of the surfaces to be protected. It is preferred, of course, that the mechanically sound film be enclosed in the laminate structure within two exterior weatherable films. The mechanically sound film consists essentially of plasticized polyvinyl chloride, and is preferably about 40 mils in thickness for most applications. It has been found, however, that polyvinyl chloride films of from 5 to 50 mils in thickness may be suitably employed. When less than 5 mils thick, the laminate structure is not sufficiently strong for general use, and if more than 50 mils thick, the material tends to lose its flexibility. The plasticizer employed in the polyvinyl chloride films is preferably dimethyl phthalate. This plasticized material is commercially available, and is defined in specification MIL–T–18080, which is a United States military specification for this specific material. The outer weatherable films are fluorinated hydrocarbons such as polyvinyl fluoride or polychlorotrifluoroethylene. Polyvinyl fluoride films are commercially available under the code name "Tedlar" from E. I. du Pont de Nemours & Company of Wilmington, Del. Polychlorotrifluoroethylene films are available under the code name "Aclar" from Allied Chemical Corporation. For most purposes, a 5 mil exterior film of either of these types is adequate, and for general use, a film of from 2 to 5 mils has been found satisfactory. A thinner film may lose its ability to be impermeable to water vapor and also to the plasticizer used. A heavier film is economically unsound. The adhesive bond which is prepared between the individual layers is preferably a film of about 0.5 mil of a polyester adhesive impregnated with from about 1½ percent to about 3 percent of an ultraviolet absorbing powder such as, for example, a material identified in the trade under the code name "Cyasorb #9" and available from American Cyanamid Company. This material while transparent and non-absorbing to visible light is capable of absorbing ultraviolet radiation, and will exclude a substantial portion of incident ultraviolet radiation applied to the surface of the laminate structure. While many of the commercially available polyester resin adhesives may be successfully employed, one particular adhesive which has been found readily adapted to the bonding of fluorinated hydrocarbons is the polyester adhesive identified by the code name "GT–201" available from the G. T. Schjeldahl Company of Northfield, Minn.

Turning to the drawing, it will be seen that the mechanically sound film is enclosed in the laminate between a pair of weather-proof films. In the flow diagram of FIGURE 2, it is seen that the outer layers are bonded to the inner layer with an adhesive containing an ultraviolet absorbing compound. It is seen, therefore, that the improved properties of the laminate structure are acquired by the selective use of materials in the fabrication of the laminate sandwich structure.

It will, of course, be understood that various changes may be made in the form, details, arrangement, and proportions of the parts without departing from the scope of my invention as set forth in the appended claims.

What is claimed is:

1. An optically clear, mechanically sound weatherable laminate structure comprising a film of mechanically sound strength and at least one protective weatherable film bonded thereto by an adhesive bond, said film of mechanically sound strength consisting essentially of polyvinyl chloride, said weatherable film being a fluorinated hydrocarbon film selected from the class consisting of polychlorotrifluoroethylene and polyvinyl fluoride, said adhesive containing an ultraviolet radiation absorber for excluding a substantial portion of the incident ultraviolet radiation from said film of mechanically sound strength.

2. The laminate structure as defined in claim 1 being particularly characterized in that said polyvinyl chloride film is a plasticized polyvinyl chloride film.

3. An optically clear, mechanically sound weatherable laminate structure comprising a film of mechanically sound strength enclosed between exteriorly disposed protective weatherable films, the films being bonded together by an adhesive bond, said film of mechanically sound strength consisting essentially of plasticized polyvinyl chloride, said weatherable film being a fluorinated hydrocarbon film selected from the class consisting of polychlorotrifluoroethylene and polyvinyl fluoride, said adhesive containing a quantity of an ultraviolet radiation absorber for excluding a substantial portion of the incident ultraviolet radiation from said film of mechanically sound strength.

4. An optically clear mechanically sound weatherable laminate structure comprising a mechanically sound weatherable laminate structure including a film of mechanically sound strength enclosed between a pair of externally disposed protective weatherable films and bonded thereto by a transparent thin film forming an adhesive bond, said film of mechanically sound strength consisting essentially of plasticized polyvinyl cloride, said weatherable film being polychlorotrifluoroethylene, said adhesive containing a quantity of an ultraviolet radiation absorber capable of blocking a substantial portion of the applied incident ultraviolet radiation from said film of mechanically sound strength.

5. The optically clear mechanically sound weatherable laminate structure as defined in claim 4 being particularly characterized in that said polyvinyl film has a thickness of from 5 to 50 mils.

6. The optically clear mechanically sound weatherable laminate structure as defined in claim 5 being particularly characterized in that the said polychlorotrifluoroethylene film has a thickness from 2 to 5 mils.

References Cited

UNITED STATES PATENTS

| | | | |
|---|---|---|---|
| 2,774,704 | 12/1956 | Smith | 161—189 |
| 2,809,130 | 10/1957 | Rappaport | 161—189 X |
| 2,892,747 | 6/1959 | Dye | 161—214 |
| 3,107,199 | 10/1963 | Tocker | 161—231 |
| 3,113,907 | 12/1963 | Tocker | 161—231 X |
| 3,133,854 | 5/1964 | Simms | 161—189 |
| 3,257,266 | 6/1966 | Sapper | 161—188 |

FOREIGN PATENTS

| | | |
|---|---|---|
| 805,388 | 12/1958 | Great Britain. |

EARL M. BERGERT, *Primary Examiner.*

HAROLD ANSHER, *Examiner.*